(12) United States Patent
Akamatsu et al.

(10) Patent No.: US 11,507,181 B2
(45) Date of Patent: Nov. 22, 2022

(54) INPUT APPARATUS HAVING VIRTUAL KEYS SET ON REFERENCE PLANE

(71) Applicant: NTT DOCOMO, INC., Chiyoda-ku (JP)

(72) Inventors: Shigeru Akamatsu, Chiyoda-ku (JP); Koichi Asano, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 17/269,079

(22) PCT Filed: Jun. 11, 2019

(86) PCT No.: PCT/JP2019/023038
§ 371 (c)(1),
(2) Date: Feb. 17, 2021

(87) PCT Pub. No.: WO2020/039703
PCT Pub. Date: Feb. 27, 2020

(65) Prior Publication Data
US 2021/0173473 A1   Jun. 10, 2021

(30) Foreign Application Priority Data

Aug. 21, 2018 (JP) .............................. JP2018-154773

(51) Int. Cl.
*G06F 3/01* (2006.01)
(52) U.S. Cl.
CPC .................... *G06F 3/011* (2013.01)
(58) Field of Classification Search
CPC .......... A47G 2200/08; A47G 2200/143; A47G 7/06; A47G 7/08; F21V 23/0442;
(Continued)

(56) References Cited

U.S. PATENT DOCUMENTS

2010/0156787 A1* 6/2010 Katayama ............... G06F 3/012
                                                      345/157
2010/0156836 A1* 6/2010 Katayama ................. G01S 5/16
                                                      345/173
(Continued)

FOREIGN PATENT DOCUMENTS

JP        2010-238208 A     10/2010
JP        2014-165660 A      9/2014
WO    WO 2012/176315 A1    12/2012

OTHER PUBLICATIONS

International Search Report dated Aug. 6, 2019 in PCT/JP2019/023038 filed on Jun. 11, 2019, 1 page.
(Continued)

*Primary Examiner* — Richard J Hong
(74) *Attorney, Agent, or Firm* — Oblon, McClelland, Maier & Neustadt, L.L.P.

(57) ABSTRACT

An input apparatus is provided that includes a determiner that determines a reference plane, which has a plurality of virtual keys, based on fingertip positions of at least three fingers from among fingertip positions of a plurality of fingers in an initial state; a virtual key setter that sets on the reference plane, a plurality of detection ranges that respectively correspond to the plurality of virtual keys and that each detect a pressing of a corresponding virtual key based on a fingertip position of a specific finger from among the fingertip positions; and a pressed key specifier that specifies a virtual key that is pressed, from among the plurality of virtual keys, according to a positional relationship between the fingertip positions of the plurality of fingers in an input operation, and the plurality of detection ranges set on the reference plane for each of the plurality of virtual keys.

7 Claims, 9 Drawing Sheets

(58) Field of Classification Search
CPC ............... F21V 23/045; F21V 33/0028; F21Y 2113/13; F21Y 2115/10; G06F 3/16; G06F 3/167; G06F 3/04845; G06F 3/012; G06F 3/0304; G06F 3/011; G09F 2023/0025; G09F 23/00; G09F 27/00; G09G 2320/0666; G09G 2354/00; G09G 3/03; H04R 1/028; H04R 2420/07; G06T 19/006; G01S 5/16; G06V 40/28

See application file for complete search history.

(56) References Cited

U.S. PATENT DOCUMENTS

| | | | |
|---|---|---|---|
| 2014/0105455 A1* | 4/2014 | Murase | G06V 40/28 |
| | | | 382/103 |
| 2015/0040040 A1* | 2/2015 | Balan | G06F 3/0304 |
| | | | 715/762 |
| 2016/0018985 A1* | 1/2016 | Bennet | G06F 3/011 |
| | | | 345/175 |
| 2016/0085379 A1 | 3/2016 | Cho et al. | |
| 2017/0371405 A1* | 12/2017 | Kwon | G06T 19/006 |
| 2018/0342103 A1* | 11/2018 | Schwarz | G06F 3/04845 |

OTHER PUBLICATIONS

Japanese Office Action dated Nov. 30, 2021 in Japanese Patent Application No. 2020-538192 (with English translation), 9 pages.
Office Action dated Jun. 28, 2022 in Japanese Application No. 2020-538192 (w/computer-generated English translation).

\* cited by examiner

INPUT APPARATUS HAVING VIRTUAL KEYS SET ON REFERENCE PLANE

TECHNICAL FIELD

The present invention relates to an input apparatus.

BACKGROUND ART

In recent years, techniques for performing input operations using a virtual keyboard have been developed. Patent Document 1 discloses a method of storing virtual keyboards of varying sizes, selecting a virtual keyboard that fits the size of a user's hands, arranging keys in accordance with the positions of the hands, and detecting the keys that are pressed, based on specific movement of fingers.

RELATED ART DOCUMENT

Patent Documents

Patent Document 1: Japanese Patent Application Laid-Open Publication No. 2014-165660

SUMMARY OF THE INVENTION

Problem to be Solved by the Invention

However, with conventional techniques, it is not clear how keys are arranged, and at which positions, in real space. Consequently, it is not possible to produce a virtual keyboard that fits a user's hands well, and therefore, there is a high probability that the pressing of keys cannot be detected properly. Furthermore, there is also a common problem that, when a user uses a virtual keyboard, a selection of a virtual key, as well as a determination that a virtual key has been pressed, cannot be made accurately.

Means of Solving the Problem

To solve the above problems, an input apparatus according to a preferred aspect of the present invention has: a determiner configured to determine a reference plane, on which a plurality of virtual keys are arranged, based on fingertip positions of at least three fingers from among fingertip positions of a plurality of fingers in an initial state; a virtual key setter configured to set, on the reference plane, a plurality of detection ranges that correspond to respective ones of the plurality of virtual keys and that each detect a pressing of a corresponding virtual key based on a fingertip position of a specific finger from among the fingertip positions of the at least three fingers in the initial state; and a pressed key specifier configured to specify a virtual key that is pressed, from among the plurality of virtual keys, according to a positional relationship between the fingertip positions of the plurality of fingers in an input operation, and the plurality of detection ranges set on the reference plane for each of the plurality of virtual keys.

Effects of the Invention

According to the input apparatus of the present invention, detection ranges for detecting the pressing of virtual keys are set on a reference plane, which is defined according to the fingertip positions of the fingers of the user, so that it is possible to specify, with high accuracy, the virtual keys that are pressed.

MODES FOR CARRYING OUT THE INVENTION

1. First Embodiment 1.1. External Structure of Input Apparatus

Figure 1:
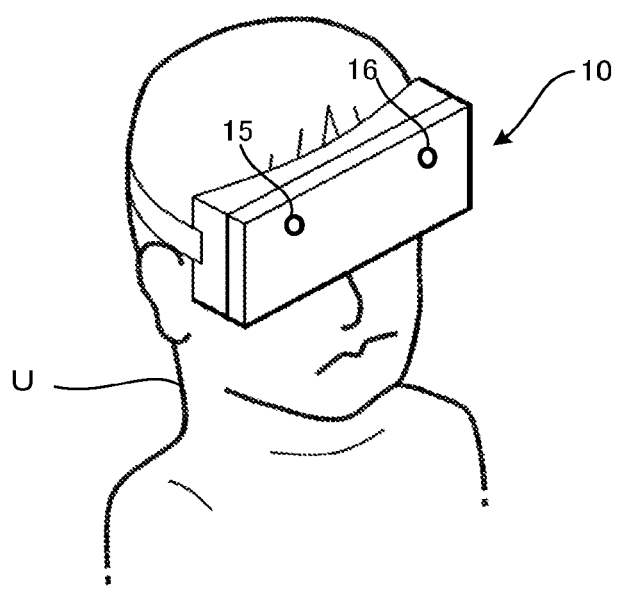
FIG. 1 is a perspective view illustrating an external view of an input apparatus according to an embodiment of the present invention.

FIG. 1 is a perspective view showing an external view of an input apparatus according to an embodiment of the present invention. The input apparatus 10 shown in FIG. 1 is a goggle-type head mounted display. A user U wears the input apparatus 10 on the head. In a state in which the user U wears the input apparatus 10 on the head, the user U is able to see visible images displayed on a display device 14 provided inside the input apparatus 10.

The display device 14 can display web content, such as games in which the characters of the user U battle in virtual space, 3D movies, social networking services (SNS), etc., or e-mails and the like. In a state in which the input apparatus 10 is attached to the head of the user U, the user U is not able to see by sight the outside of the display device 14. To enable the user U to input data, such as text, even in this state, the input apparatus 10 has functions for accepting data input using a virtual keyboard. A virtual keyboard refers to a keyboard that is produced virtually, and that does not exist in real space. Virtual keys are arranged on a virtual keyboard.

1.2. Hardware Configuration of Input Apparatus

Figure 2:
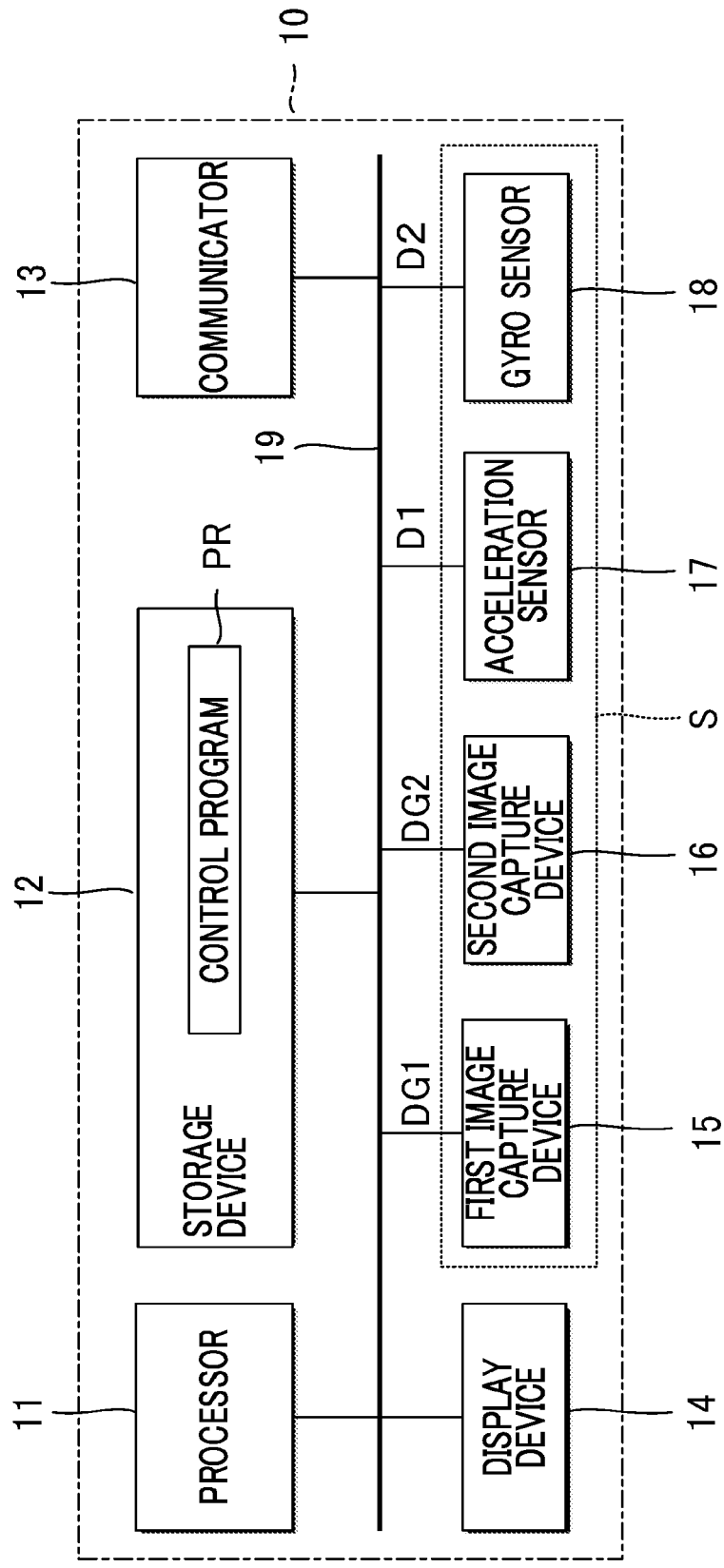
FIG. 2 is a block diagram showing an example of a hardware configuration of the input apparatus according to the embodiment.

FIG. 2 is a block diagram showing an example of a hardware configuration of the input apparatus 10. The input apparatus 10 has a processor 11, a storage device 12, a communicator 13, a display device 14, a sensor group S, and a bus 19 to connect therebetween. The bus 19 may comprise a single bus, or it may be comprised of buses for different elements.

The processor 11 controls the entire input apparatus 10, and comprises, for example, a single chip or multiple chips.

The processor 11 may be constituted of a central processing unit (CPU), which includes, for example, interfaces with peripheral devices, computing devices, registers, etc. It is of note that part or all of the functions of the processor 11 may be implemented by hardware such as a digital signal processor (DSP), an application specific integrated circuit (ASIC), a programmable logic device (PLD), and a field programmable gate array (FPGA). The processor 11 executes a variety of processes in parallel or sequentially.

The storage device 12 is a recording medium readable by the processor 11, and stores programs, including the control program PR executed by the processor 11, and a variety of data for use by the processor 11. The storage device 12 comprises, for example, one or more types of storage circuits such as a read only memory (ROM), an erasable programmable ROM (EPROM), an electrically erasable programmable ROM (EEPROM), and a random access memory (RAM).

The communicator 13 communicates with other devices, and has functions for communicating with other devices via a network, such as a mobile communication network or the Internet, and has functions for communicating with other devices in short range radio communication. Short range radio communication includes, for example, Bluetooth (registered trademark), ZigBee, WiFi (registered trademark), etc.

The display device 14 displays a variety of images under the control of the processor 11. For example, a variety of display panels, such as a liquid crystal display panel, an organic electroluminescent (EL) display panel, etc., can be used suitably as the display device 14.

The sensor group S is constituted of sensors that measure physical quantities. The input apparatus 10 specifies three dimensional shapes of the left and right hands of the user U based on output data from the sensor group S. The sensor group S of this example has a first image capture device 15, a second image capture device 16, an acceleration sensor 17, and a gyro sensor 18. The first image capture device 15 captures an image of the subject, to output first image data DG1 in accordance with the imaging result. The second image capture device 16 captures an image of the subject, to output first image data DG2 in accordance with the imaging result. As shown in FIG. 1, the first image capture device 15 and the second image capture device 16 are placed a predetermined distance apart from each other. Consequently, when images of the left and right hands of the user U are captured, the three dimensional shapes of the left and right hands can be specified based on the first image data DG1 and the second image data DG2. It is to be noted that the configuration for specifying the shapes of the left and right hands in three dimensions is not limited to the first image capture device 15 and the second image capture device 16. For example, three or more image capture devices may be used to specify the three dimensional shapes of hands. That is, to specify the three dimensional shape of the hands, a minimum of two sensors that measure physical quantities may only need to be used. In the following description, "hand" refers to the part of the body of the user U from the wrist to the fingertips, and includes the thumb, the index finger, the middle finger, the ring finger, and the little finger. It is to be noted that, in the following description, what is commonly referred to as a "thumb" in English-speaking countries may also be referred to as a "finger" (digit). That is, "fingers" is a concept that includes the thumb, the index finger, the middle finger, the ring finger, and the little finger. The shape of a hand includes the fingertip positions of the five fingers and the shape of the palm.

The acceleration sensor 17 measures acceleration in each direction of three axes that are orthogonal to one another, to output acceleration data D1 in accordance with the measurement results. The acceleration data D1 represent acceleration exerted on the input apparatus 10. Also, the gyro sensor 18 measures angular acceleration of rotation about each of the yaw axis, the pitch axis, and the roll axis, which are orthogonal to one another, to output angular acceleration data D2 indicative of the measurement results. The inclination of the input apparatus 10 can be detected based on the angular acceleration data D2.

1.3. Functions of Input Apparatus

Figure 3:
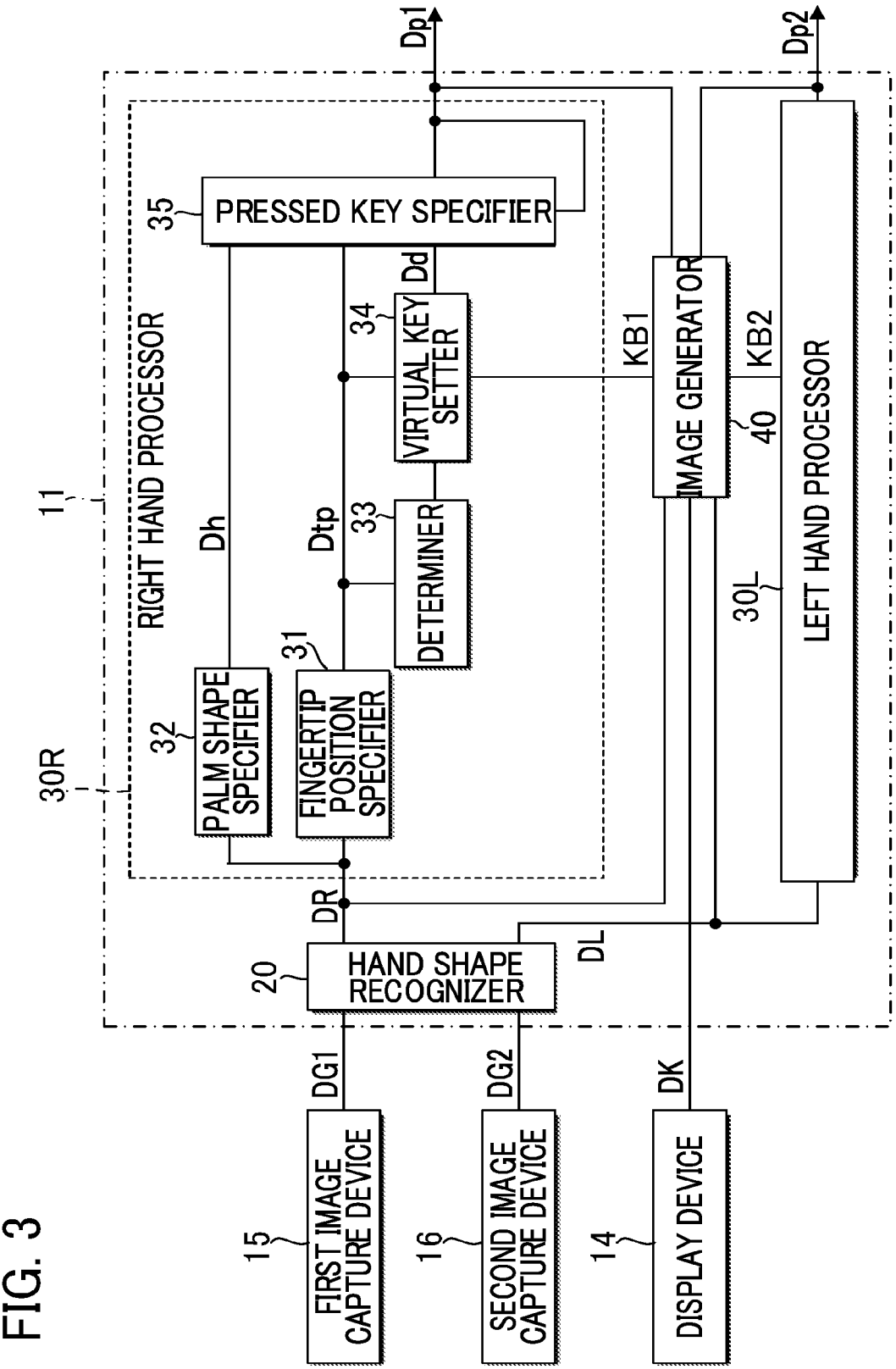
FIG. 3 is a functional block diagram showing functions of the input apparatus according to the embodiment.

FIG. 3 is a functional block diagram showing functions of the input apparatus 10. The processor 11 executes a control program PR that is read from the storage device 12. By executing the control program PR, the functions of a hand shape recognizer 20, a right hand processor 30R, a left hand processor 30L, and an image generator 40 are realized.

The hand shape recognizer 20 generates hand shape data DR and hand shape data DL that each represent the shape of the respective hands in three dimensions of the user U, based on the first image data DG1 and the second image data DG2. The first image data DG1 and the second image data DG2 are examples of output data of sensors that measure physical quantities. The hand shape data DR are indicative of the shape of the right hand of the user U, and the hand shape data DL are indicative of the shape of the left hand of the user U. Each of the hand shape data DR and the hand shape data DL are indicative of the shape of a corresponding hand, for example, in the form of a wire frame.

The right hand processor 30R generates virtual keyboard data KB1 indicative of a virtual keyboard for the right hand, and pressed key data Dp1 indicative of a virtual key that is pressed by the right hand of the user U, based on the hand shape data DR. The left hand processor 30L generates virtual keyboard data KB2 indicative of a virtual keyboard for the left hand, and pressed key data Dp2 indicative of a virtual key that is pressed by the left hand of the user U, based on the hand shape data DL. That is, in the present embodiment, two virtual keyboards, separated into left and right, are used for input operations by the user U. It is to be noted that the left hand processor 30L is configured similarly to the right hand processor 30R, and therefore, description of the left hand processor 30L will be omitted.

The right hand processor 30R has a fingertip position specifier 31, a palm shape specifier 32, a determiner 33, a virtual key setter 34, and a pressed key specifier 35. The fingertip position specifier 31 generates fingertip position data Dtp indicative of fingertip positions of the five fingers based on the hand shape data DR. The palm shape specifier 32 generates palm shape data Dh indicative of the shape of the palm based on the hand shape data DR.

The determiner 33 determines based on the fingertip positions of a plurality of fingers in the initial state a reference plane on which keys are arranged. Here, the number of fingertip positions required to determine the reference plane is at least three. The initial state is a state before input operations are performed, and in the initial state, the user U holds the left and right hands to have the position of the virtual keyboard determined for the right hand.

To be more specific, the determiner 33 specifies, based on the fingertip position data Dtp, fingertip positions of three fingers from among the five fingers. The determiner 33 determines, as the reference plane, a plane including the specified fingertip positions of the three fingers. The reference plane is not limited to a flat plane, and may be a curved plane. The fingertip positions of the three fingers can be considered as positions that are in contact with the virtual keyboard, so that the determiner 33 can determine the reference plane based on the fingertip positions of the three fingers. Once three points are determined in three dimensional space, it is possible to determine, uniquely, a flat plane on which these three points are included. In the event the reference plane should be a flat plane, the determiner 33 determines a flat plane that includes the fingertip positions of three fingers to be the reference plane. On the other hand, in the event the reference plane should be a curved plane, the determiner 33 determines a curved plane by using a predetermined function. The predetermined function uniquely defines a curved plane that corresponds to the three dimensional coordinates of three points that are input to the function. The determiner 33 inputs the fingertip positions of the three fingers to the predetermined function, to determine as the reference plane a curved plane that includes the fingertip positions of the three fingers. In the event the reference plane should be a curved plane, the virtual keyboard may be a so-called ergonomic type keyboard.

Here, the fingertip positions of the three fingers used to determine the reference plane are, preferably, the fingertip position of the thumb, the fingertip position of the ring finger, and the fingertip position of the little finger. The thumb is located on the left end, the ring finger to the left of the right end, and the little finger on the right end, when viewed from the back of the right hand. Consequently, the reference plane for the entire right hand can be determined with these fingers. Since the thumb, the ring finger and the little finger are fingers for stabilizing the position of the palm in real space, the determiner 33 can determine the reference plane more accurately, compared to using other combinations of fingers.

Furthermore, the determiner 33 may determine a provisional reference plane based on the fingertip positions of the three fingers in the initial state, and determine the reference plane by correcting the provisional reference plane based on the fingertip position of at least one finger other than the three fingers. By determining the reference plane in this way, the fingertip position of at least one finger other than the three fingers can be reflected in the reference plane. Consequently, compared to the case in which the reference plane is determined without determining a provisional reference plane, it is possible to determine a reference plane (a flat plane or a curved plane) that is easier for the user U to use. In this case, the reference plane is determined based on the fingertip positions of four fingers, and these four fingers preferably include the little finger, the ring finger and the thumb. For example, the determiner 33 may specify a flat plane as a provisional reference plane based on the fingertip positions of the three fingers, and specify a reference plane of a curved plane that fits the hand of the user U by correcting the provisional reference plane based on the fingertip position of the index finger and the fingertip position of the middle finger. In this case, the reference plane may be determined by using a predetermined function, whereby a reference plane of a curved plane is specified by correcting a provisional reference plane based on the fingertip position of at least one finger other than the three fingers.

The determiner 33 may determine the reference plane based on the fingertip positions of four or more fingers. In this case, assuming that the distance from the fingertip position of each finger to the reference plane is an error, the determiner 33 may use the least squares method to determine a reference plane that minimizes the total error.

Figure 4A:
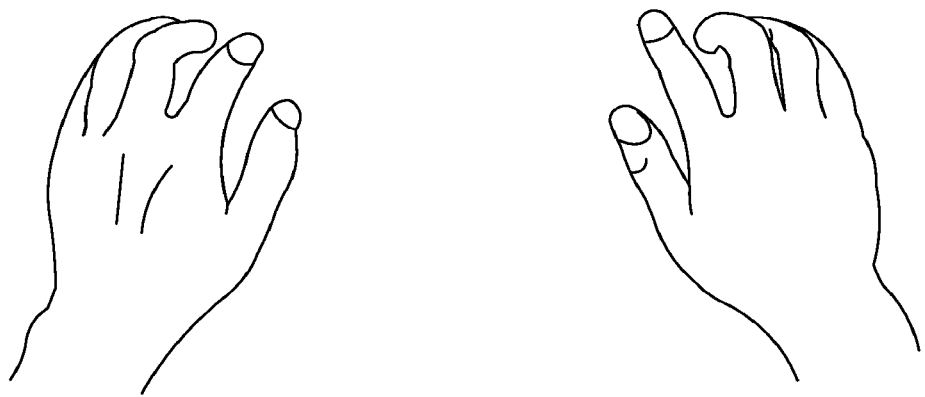
FIG. 4A is a perspective view illustrating examples of left and right hands of a user in an initial state according to the embodiment.
Figure 4B:
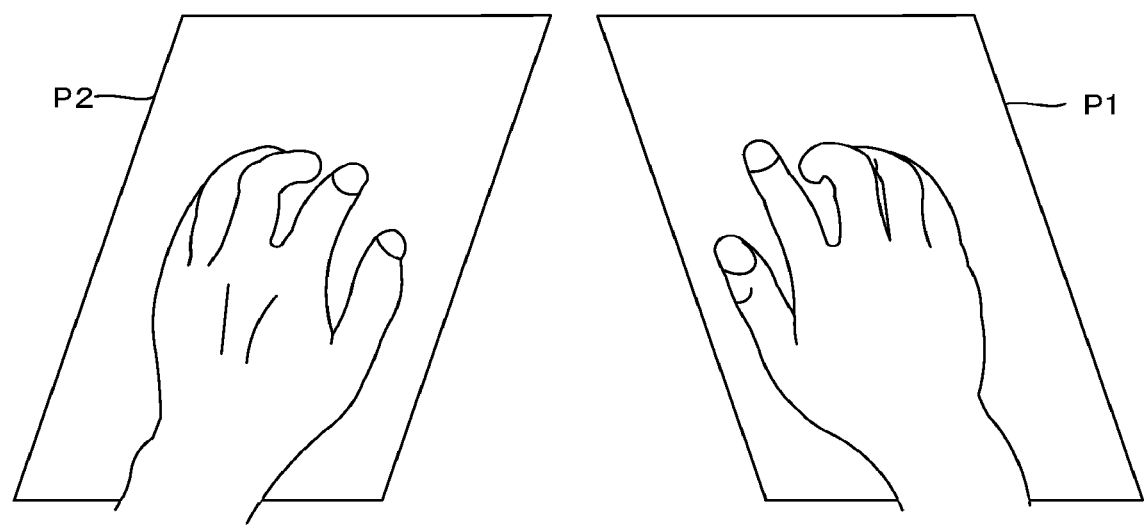
FIG. 4B is a perspective view for explaining reference planes that correspond to left and right hands according to the embodiment.

For example, when the user U holds the right and left hands as shown in FIG. 4A, the determiner 33 of the right hand processor 30R determines a reference plane P1 (an example of a first reference plane) shown in FIG. 4B, and the determiner 33 of the left hand processor 30L determines a reference plane P2 (an example of a second reference plane) shown in FIG. 4B. By setting different reference planes P1 and P2 for the right hand and the left hand, a virtual keyboard for the right hand and a virtual keyboard for the left hand can be generated.

It is to be noted that the determiner 33 of the right hand processor 30R may move the reference plane P1 by following the movement of the right hand of the user U during input operations by the user U. To be more specific, the determiner 33 may specify the movement of the palm based on the palm shape data Dh, to relocate the reference plane in accordance with the movement of the palm. Also, for example, the determiner 33 may specify the movement of the palm from the movement of the center of gravity in the palm. When the movement of fingers and the movement of the palm during input operations are compared, the degree of the movement of the fingers is greater than the degree of the movement of the palm. Consequently, it is preferable to relocate the reference plane based on the movement of the palm. In this way, by relocating the reference plane following the movement of the hand of the user U, the virtual keyboard can be relocated as if it were attached to the hand of the user U. Even if the posture of the user U changes during input operations (for example, the user U sitting on a sofa lies down on the sofa), the user U will be able to continue performing the input operations. When the operation of following the hand of the user U is to be finished, the determiner 33 may detect a predetermined gesture, such as making a fist, based on the hand shape data DR.

The virtual key setter 34 sets a detection range on the reference plane, on a per virtual key basis, based on the fingertip positions of specific fingers from among the at least three fingers used by the determiner 33 to determine the reference plane. Each detection range is a range for detecting a pressing of a corresponding virtual key from among the virtual keys. The virtual key setter 34 outputs detection range data Dd indicative of the detection ranges corresponding to the virtual keys on a one-by-one basis, to the pressed key specifier 35. It is to be noted that the specific fingers are preferably the little finger and the ring finger. Here, it is preferable if one finger the user U uses for pressing is assigned to some or all of the detection ranges. In this case, the detection range data Dd indicates an association among one virtual key, one detection range, and a finger to use to press that virtual key. For example, the index finger of the right hand may be assigned to a detection range for a virtual key indicating "J", and the middle finger of the left hand may be assigned to a detection range for a virtual key indicating "D". In so-called blind touch (touch typing), which finger presses which virtual key is usually determined in advance. Consequently, by determining in advance a finger to use to press a corresponding virtual key for a given detection range, the detection errors of virtual keys specified by the pressed key specifier 35 (described later) are reduced. It is to be noted that it is not necessary to define one finger the user U uses for pressing for every detection range. This is because even when a finger is not determined for each detection range, the relationship between a fingertip position of each finger and a virtual key that is pressed is learned by an estimation model 350 (described later).

Furthermore, the virtual key setter 34 generates, based on the fingertip positions of the specific fingers, virtual keyboard data KB1 indicative of a virtual keyboard in which virtual keys are arranged on the reference plane P1, to output the virtual keyboard data KB1 to the image generator 40.

Figure 5:
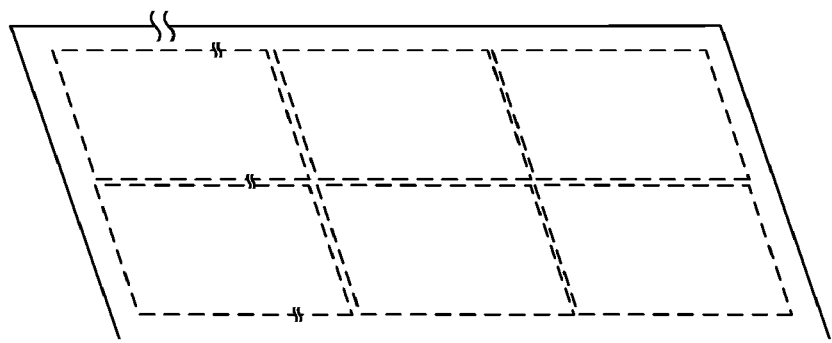
FIG. 5 is an explanatory diagram for explaining detection ranges according to the embodiment.

FIG. 5 shows examples of detection ranges set on a reference plane. In this figure, each one range surrounded by dotted lines is a detection range corresponding to one virtual key.

The pressed key specifier 35 specifies a virtual key that is pressed, according to the positional relationship between the fingertip position of each finger and the shape of the palm during input operations, and the detection ranges set on the reference plane on a per virtual key basis. The fingertip position of each fingertip is given by the fingertip position data Dtp. The shape of the palm is given by the palm shape data Dh.

Figure 6:
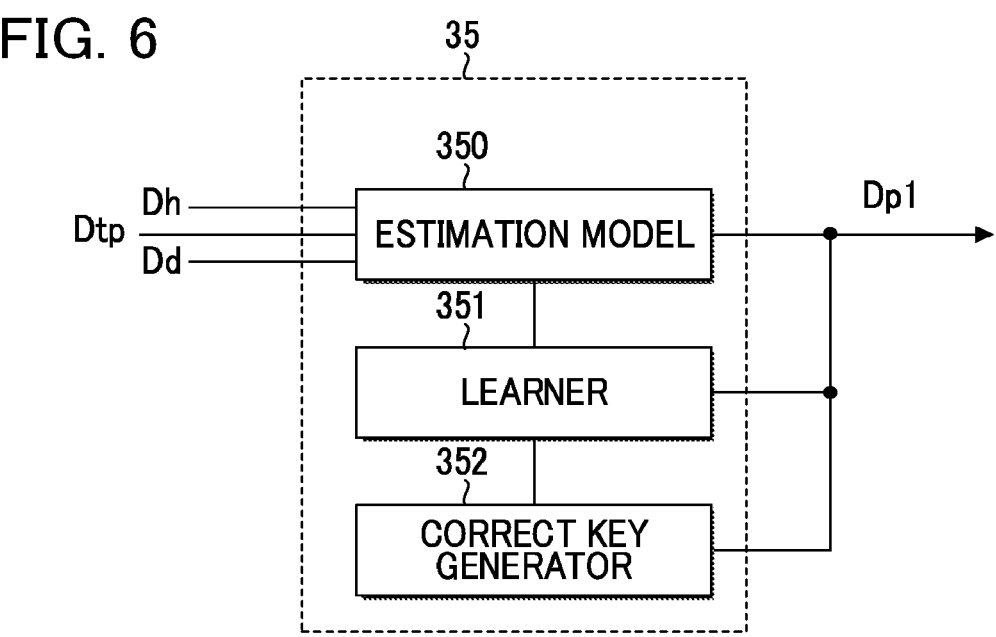
FIG. 6 is a functional block diagram showing in detail functions of a pressed key specifier according to the embodiment.

FIG. 6 shows functional blocks in the pressed key specifier 35 in detail. As shown in this figure, the pressed key specifier 35 has the estimation model 350, a learner 351 and a correct key generator 353.

The estimation model 350 estimates a virtual key that is pressed, based on the fingertip position of each finger indicated by the fingertip position data Dtp, the shape of the palm indicated by the palm shape data Dh, and the detection ranges indicated by the detection range data Dd. The estimation model 350 generates pressed key data Dp1 indicative of the estimated virtual key. The estimation model 350 is configured using, for example, an artificial neural network.

The learner 351 compares the virtual key estimated by the estimation model 350, with a correct key, and reflects, based on the comparison results, whether the estimated virtual key is correct or incorrect, to the estimation model 350.

The correct key generator 352 specifies a correct key based on the pressed key data Dp1. When a virtual key estimated by the estimation model 350 is correct, the user U performs no correcting operation for changing a character or symbol that has been input. On the other hand, when a virtual key estimated by the estimation model 350 is incorrect, the user U performs the abovementioned correcting operation. The correct key generator 352 monitors the pressed key data Dp1, and determines whether the user U has performed the correcting operation. If a result of the determination is affirmative, the correct key generator 352 determines the virtual key estimated by the correcting operation as the correct key. On the other hand, when a result of the determination is negative, the correct key generator 352 determines the estimated virtual key as the correct key.

The pressed key specifier 35 reflects the habits of the user U in input operations to the estimation model 350, through machine learning, so that the estimation accuracy of pressed virtual keys can be improved. Furthermore, since the fingertip position data Dtp and the palm shape data Dh are input to the estimation model 350, learning results pertaining to the relationship between fingertip positions and the shapes of the palm are gradually accumulated in the estimation model 350. As described above, the fingertip position data Dtp is generated based on the first image data DG1 and the second image data DG2. Depending on the positional relationship between the input apparatus 10 and the fingertips of the user U, the fingertips of the user U may be hidden behind the input apparatus 10, and therefore, the fingertips of the user U may not be reflected in the first image data DG1 and the second image data DG2. In such a case, the estimation model 350 estimates the pressed key data Dp1 based on the palm shape data Dh. Since the learned relationship between fingertip positions and shapes of the palms is reflected in the estimation model 350, even when the fingertip position data Dtp is not valid, it is still possible to estimate a virtual key that is pressed. Furthermore, the estimation model 350 estimates a virtual key that is pressed, for a detection range for which one finger the user U uses for pressing is assigned, by taking into account the finger that the user U uses for pressing. On the other hand, there may be detection ranges for which no fingers the user U uses for pressing are assigned. Virtual keys for which no fingers are assigned may include, for example, special virtual keys, such as a virtual key indicating "Enter", a virtual key indicating "Shift", and a virtual key indicating "Ctrl", etc. When one of these special virtual keys is pressed, the shape of the palm is significantly different, compared to when a virtual key indicating a character is pressed. Therefore, even if no pressing fingers are assigned to the detection ranges corresponding to these special virtual keys, the estimation model 350 can still estimate accurately a virtual key that is pressed, based on the shape of the palm.

Figure 7:
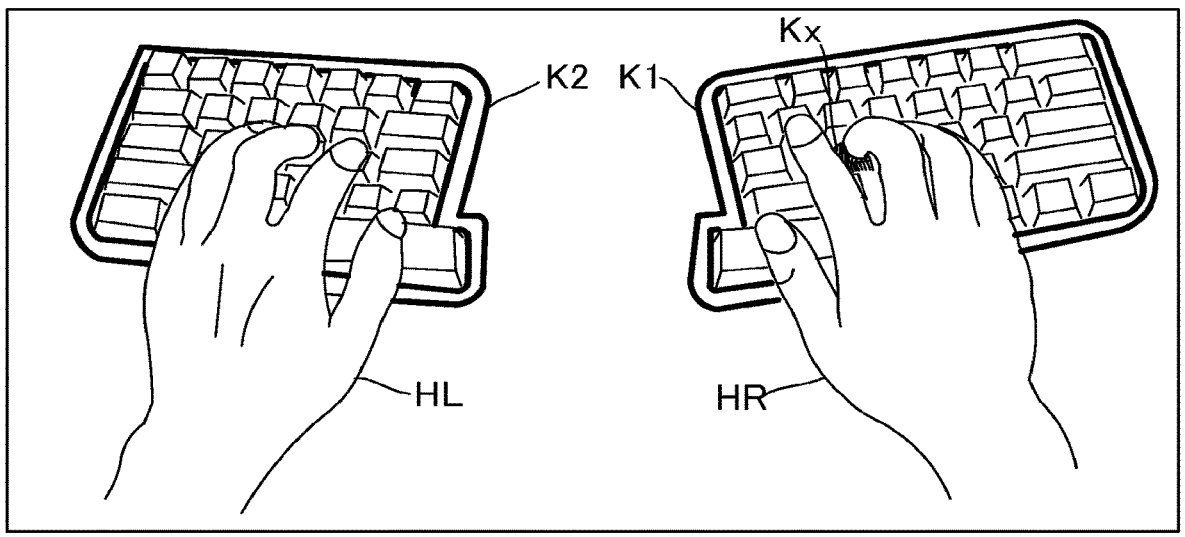
FIG. 7 is an explanatory diagram showing an example of a screen displayed on a display apparatus according to the embodiment.

Referring back to FIG. 3, the image generator 40 generates pixel data DK based on the virtual keyboard data KB1 for the right hand, the virtual keyboard data KB2 for the left hand, the hand shape data DR for the right hand, the hand shape data DL for the left hand, the pressed key data Dp1 for the right hand and the pressed key data Dp2 for the left hand, to output the pixel data DK to the display device 14. An image shown in FIG. 7, for example, is displayed on the display device 14. As shown in this figure, the display device 14 displays a right hand virtual keyboard K1 and the right hand HR, with a left hand virtual keyboard K2 and the left hand HL. Furthermore, the display device 14 displays an image of a virtual key Kx that is pressed, such that the virtual key Kx is distinguishable from images of the other virtual keys. In this example, the virtual key Kx that is pressed is displayed in a different color from the other virtual keys. In another example, the size of the virtual key Kx after being pressed may be displayed larger than the size of the virtual key Kx before being pressed. Also, the virtual key Kx may be illuminated and displayed so as to be distinguishable from the other virtual keys.

Furthermore, the image generator 40 generates an image of the right hand HR by performing computer graphic processing on the hand shape data DR, and generates an image of the left hand HL by performing computer graphic processing on the hand shape data DL. However, the image generator 40 may cut out the image data indicative of an image of the right hand HR, from the first image data DG1, cut out the image data indicative of an image of the left hand EL, from the second image data DG2, and display the image of the right hand HR and the image of the left hand HL on the display device 14 after synthesizing these two cut out pieces of image data. In this case, the image generator 40 synthesizes images of the left hand and right hand virtual keyboards with the images actually captured. With this image synthesis, it is possible to display images of augmented reality (AR) on the display device 14. In addition, the determiner 33 may relocate the reference plane according to the movement of a hand (right hand or left hand). As a result of the reference plane relocation, the user U is able to see visually the virtual keyboard from the opposite side of the keyboard plane on which virtual keys are arranged (that is, the reverse side of the virtual keyboard). Thus, it is also possible to display images of mixed reality (MR) on the display device 14.

1.4. Operation of Input Apparatus

Figure 8:
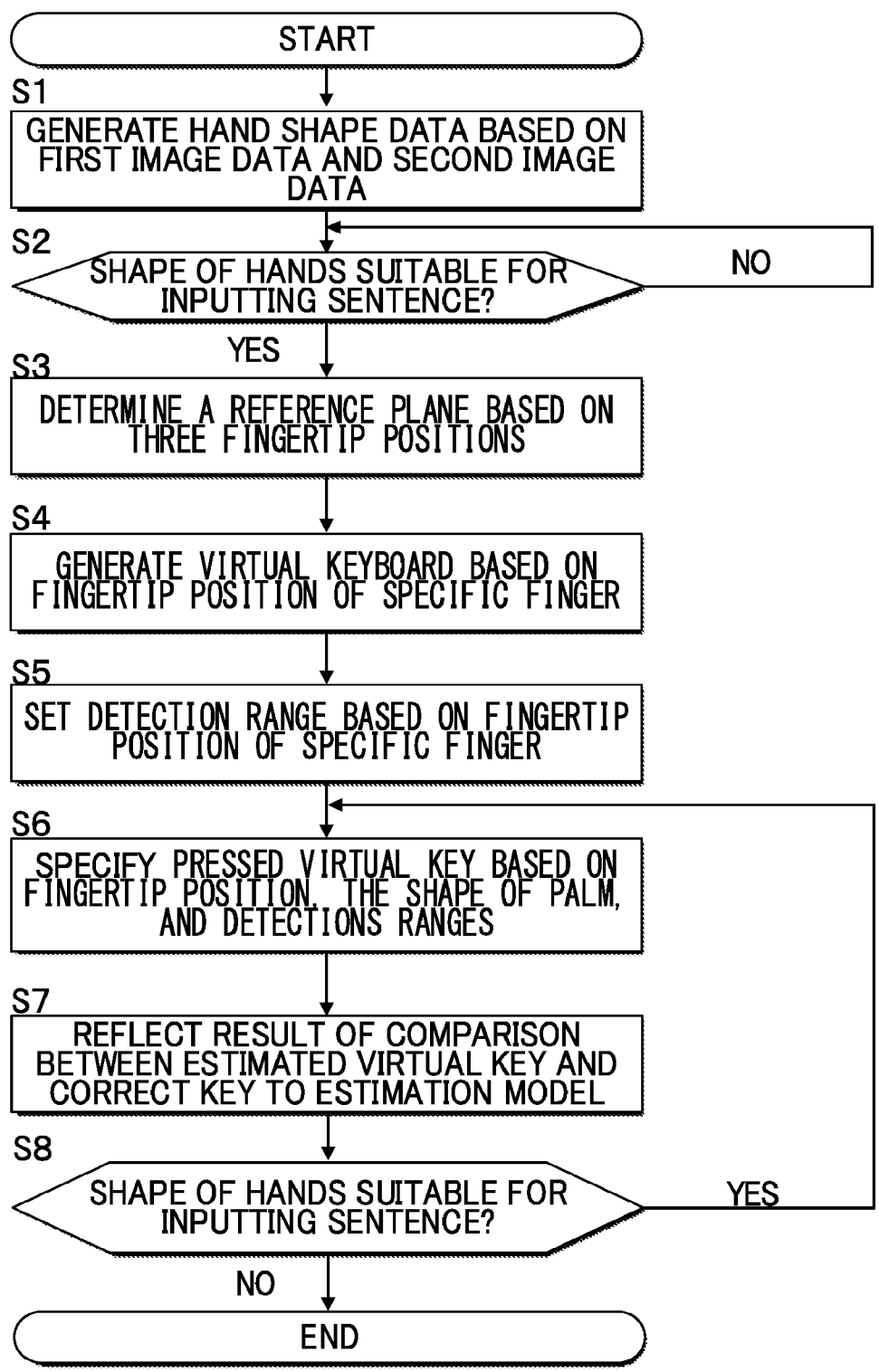
FIG. 8 is a flowchart showing an operation of the input apparatus according to the embodiment.

FIG. 8 is a flowchart showing an operation of the input apparatus 10. The operation of the input apparatus 10 will be described below with reference to FIG. 8. First, the hand shape recognizer 20 generates hand shape data DR and DL based on the first image data DG1 and the second image data DG2 (S1).

Next, when an input area for inputting a sentence such as text is displayed within the frame of view in virtual space by means of software (application), the hand shape recognizer 20 determines whether the shape of hands (the right hand and the left hand) is suitable for inputting a sentence, based on the hand shape data DR and DL (S2). Consequently, the user only has to hold the hands in a shape suitable for inputting a sentence, and the hand shape recognizer 20 determines whether an input of a sentence has been started based on output data from the sensor group S. The left hand and right hand virtual keyboards are displayed in virtual space depending on a result of the determination. Any method may be used to carry out the above determination, as long as the start of an input of a sentence can be detected based on output data from the sensor group S. In the following description, processes related to the right hand are the same as the processes related to the left hand, and therefore, the processes related to the right hand alone will be described, unless otherwise specified. The description of the processes related to the left hand will be omitted.

If a result of the determination in step S2 is affirmative, the determiner 33 uses the fingertip position data Dtp to specify positions of three fingers, and then determines, as a reference plane (specifically, the reference plane P1), a plane on which the fingertip positions of the three specified fingers are included (S3). In this example, the three fingers are the little finger, the ring finger and the thumb.

Next, the virtual key setter 34 arranges virtual keys on the reference plane to generate virtual keyboard data KB1, based on the fingertip positions of specific fingers from among the three fingers (S4). In this example, the specific fingers are the little finger and the ring finger.

Next, based on the fingertip positions of the specific fingers from among the three fingers, the virtual key setter 34 generates detection range data Dd indicative of detection ranges for a pressing of a key set on the reference plane on a per virtual key basis (S5). It is of note that the order of steps S4 and S5 may be reversed.

Next, the estimation model 350 of the pressed key specifier 35 generates pressed key data Dp1, which shows a virtual key that is pressed, according to the positional relationship between the fingertip position of each finger and the shape of the palm during input operations, and the detection ranges (S6).

Next, the learner 351 of the pressed key specifier 35 reflects the result of comparison between estimated virtual keys and the correct keys, to the estimation model 350 (S7).

After that, the hand shape recognizer 20 determines whether the shape of the hand is suitable for inputting a sentence, based on the hand shape data DR (S8). If the result of determination in step S8 is negative, that is, if the shape of the hand is not suitable for inputting a sentence, the virtual keyboard displayed in virtual space is erased. That is to say, the virtual keyboard can be erased simply by changing the shape of the hand of the user U from the shape for an input of a sentence. It is to be noted that whether the user U has performed a predetermined gesture may be determined based on the hand shape data DR and DL. This gesture represents, for example, a command to finish the input operations using the virtual keyboard. If the result of the determination in step S8 is affirmative, that is, if the shape of the hand is suitable for inputting a sentence, the processor 11 brings the process back to step S6, and repeats the processes from step S6 to step S8, until a negative determination result is yielded. If a result of the determination in step S8 is negative, the processor 11 ends the process using the virtual keyboard.

As described above, with the input apparatus 10 according to the present embodiment, the determiner 33 determines a reference plane, on which virtual keys are arranged, based on the fingertip positions of at least three fingers from among the fingertip positions of fingers in the initial state. The fingertip positions of the three fingers can uniquely determine a reference plane that lies along the positions of the fingers of the user U in real space. Furthermore, if the determiner 33 determines a reference plane according to the fingertip positions of four or more fingers, it is then possible to determine a reference plane that reflects the state of the fingers of the user U more accurately, compared to a case in which the determiner 33 determines a reference plane based on the fingertip positions of three fingers. As a result of this, it is possible to specify, more accurately, a virtual key that is pressed.

In addition, the virtual key setter 34 sets, on the reference plane, detection ranges corresponding to the respective virtual keys and each detecting a pressing of a corresponding virtual key based on a specific fingertip position from among the fingertip positions of at least three fingers in the initial state. The pressed key specifier 35 specifies a virtual key that is pressed, among the virtual keys, according to the positional relationship between the fingertip positions of fingers during input operations and the detection ranges set on the reference plane on a per virtual key basis. Since the shape of the user U's hands is reflected by the virtual key setter 34 and the pressed key specifier 35, it is possible to realize an input apparatus 10 that is easy to operate.

Furthermore, the pressed key specifier 35 has the estimation model 350, which estimates a virtual key that is pressed, amongst the virtual keys, based on data indicative of the fingertip positions of fingers, data indicative of the shape of the palm, and the detection ranges, and the learner 351, which reflects, to the estimation model 350, whether the virtual keys estimated by the estimation model 350 are correct or incorrect. With the estimation model 350 and the learner 351, it is possible to reflect the habits of the user U in input operations to the estimation model 350. As a result, the accuracy of input can be improved compared to a case in which comparison results are not reflected to the estimation model 350.

Furthermore, the input apparatus 10 has a determiner, a virtual key setter, and a pressed key specifier. The determiner determines, based on the fingertip positions of at least three fingers of the right hand in the initial state, a first reference plane corresponding to the right hand as the reference plane, and determines, based on the fingertip positions of at least three fingers of the left hand in the initial state, a second reference plane corresponding to the left hand as the reference plane; the virtual key setter sets, on the first reference plane corresponding to the right hand, detection ranges as detection ranges for the right hand based on the fingertip position of a specific finger of the right hand in the initial state from among the fingertip positions of the at least three fingers of the right hand, and sets, on the second reference plane corresponding to the left hand, detection ranges as detection ranges for the left hand based on the fingertip position of a specific finger of the left hand in the initial state from among the fingertip positions of the at least three fingers of the left hand; and the pressed key specifier specifies, according to the positional relationship between the fingertip positions of the fingers of the right hand in input operations and the detection ranges for the right hand, a virtual key that is pressed by the right hand from among the virtual keys, and specifies, according to the positional relationship between the fingertip positions of the fingers of the left hand in input operations and the detection ranges for the left hand, a virtual key that is pressed by the left hand from among the virtual keys. According to the above mode, virtual keys can be set independently for the left hand and for the right hand, so that input operations to match the size of the left and right hands or the shape of the left and right hands are possible. Furthermore, it is possible to improve the accuracy of specification of a virtual key that is pressed, compared to a case in which the left and right hands are not distinguished.

In addition, the input apparatus 10 has the hand shape recognizer 20, which generates the hand shape data DR representative the shape of hands in three dimensions based on output data that is output from the sensors. The fingertip position data Dtp indicative of the fingertip positions of fingers and the palm shape data Dh indicative of the shape of the palm, which are input to the estimation model 350, are specified based on the hand shape data DR. According to this mode, the fingertip position data Dtp and the palm shape data Dh are generated from the three dimensional hand shape data DR, so that it is possible to use the fingertip positions of the fingers and the shape of the palm in three dimensions. As a result, it is possible to improve the accuracy of estimation performed in the estimation model 350 for estimating a virtual key that is pressed.

Also, the input apparatus 10 has the display device 14, which, given a virtual keyboard on which virtual keys are arranged, displays images of virtual keys that are not pressed and images of a virtual key that is pressed, the pressed virtual key being specified by the pressed key specifier 35, such that pressed and not pressed virtual keys are distinguishable from one another. Consequently, the user U is able to know which virtual keys are pressed in input operations. As a result, the user U is able to recognize input errors in real time.

2. Modifications

The present invention is not limited to the embodiment illustrated above. Specific modes of modifications will be shown below. Any two or more modes may be selected from the following modes and combined.

Figure 9:
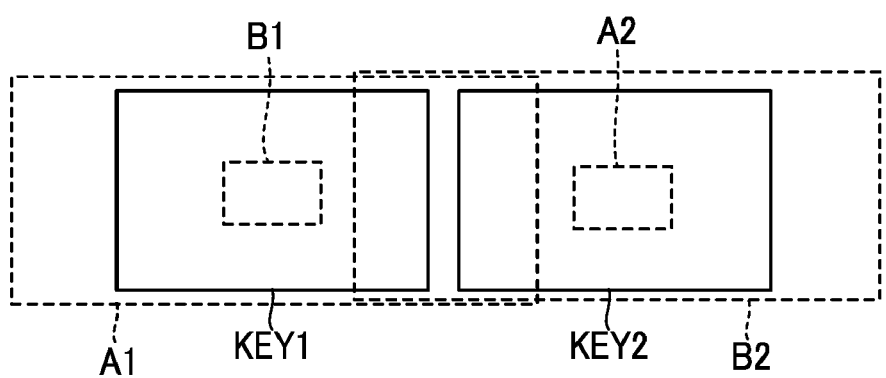
FIG. 9 is a plan view for explaining detection ranges according to Modification 1.

(1) In the embodiment described above, the virtual key setter 34 may set detection ranges for detecting a pressing of a virtual key, on a per finger basis. FIG. 9 is an explanatory diagram showing the relationship between virtual keys and detection ranges, where the virtual keys are viewed in a plan view from a direction normal to the reference plane. When a virtual key KEY1 and a virtual key KEY2 are arranged on a virtual keyboard as shown in FIG. 9, the detection range when the virtual key KEY1 is pressed by the index finger of the right hand is an area A1, the detection range when the virtual key KEY1 is pressed by the middle finger of the right hand is an area B1, the detection range when the virtual key KEY2 is pressed by the index finger of the right hand is an area A2, and the detection range when the virtual key KEY2 is pressed by the middle finger of the right hand is an area B2. That is, looking at the ranges for detecting a pressing of the virtual key KEY1, the area A1 for the index finger is larger than the area B1 for the middle finger. The detection ranges are set in such a manner because the virtual key KEY1 is meant to be pressed by the index finger, and is not meant to be pressed by the middle finger. Thus, the virtual key setter 34 sets detection ranges for detecting a pressing of virtual keys, on a per finger basis. With such setting, it is possible to improve the accuracy by the pressed key specifier 35 of estimating a virtual key that is pressed, compared to a case in which detection ranges are not set on a per finger basis for detecting a pressing of a virtual key. Setting such detection ranges is useful, for example, when the user U has a habit of pressing the virtual key KEY1 with the middle finger, or when the user U happens to press the virtual key KEY1 with the middle finger. Then, in a case in which the user U has a habit of pressing the virtual key KEY1 with the middle finger, the estimation model 350 learns the habit of the user U in input operations. Consequently, the longer the user uses the input apparatus 10, the higher the accuracy of detecting the virtual key KEY1 when the user U presses the virtual key KEY1 with the middle finger, as a result of the learning.

Figure 10:
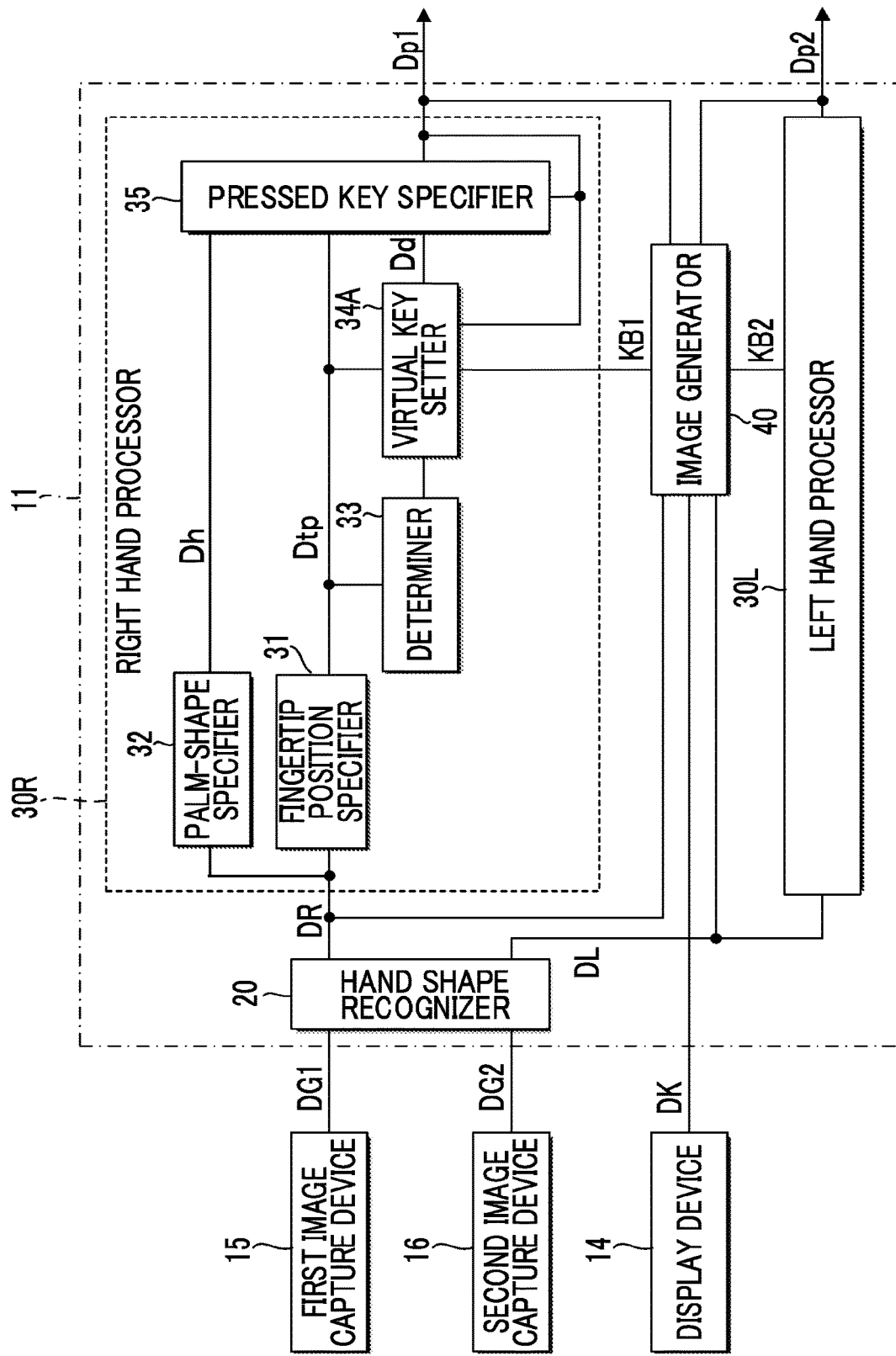
FIG. 10 is a functional block diagram showing functions of an input apparatus according to Modification 2.

(2) In the embodiment described above, the virtual key setter 34 sets detection ranges for detecting a pressing of a virtual key based on the fingertip positions of specific fingers in the initial state, but the present invention is by no means limited to this. The hardware configuration of the input apparatus 10 according to Modification 2 is the same as the configuration of the input apparatus 10 according to the embodiment shown in FIG. 2, but the functions of these two are different from each other. FIG. 10 is a functional block diagram showing the functions of the input apparatus 10 according to Modification 2.

The configuration of the input apparatus 10 shown in FIG. 10 is the same as that of the input apparatus 10 shown in the embodiment of FIG. 3, except that a virtual key setter 34A is used instead of the virtual key setter 34. The pressed key data Dp1 is fed back to the virtual key setter 34A. The virtual key setter 34A generates detection range data Dd indicative of a detection range for use for specifying that a next virtual key is pressed, based on the fingertip positions of specific fingers and a virtual key specified by the pressed key specifier 35 to have been pressed immediately previously.

For example, the shape of the palm when a virtual key indicating "E" is pressed is different for a case in which a virtual key indicating "E" is pressed after a virtual key indicating "S" is pressed and for a case in which the virtual key indicating "E" is pressed after a virtual key indicating "G" is pressed. That is, the shape of the palm varies depending on which virtual key was pressed immediately previously. According to Modification 2, the accuracy in estimating a virtual key that is pressed improves by taking into account the shape of the palm and which virtual key was pressed immediately previously.

(3) In the embodiment described above, the input apparatus 10 generates two virtual keyboards that are separated into left and right, but the present invention is by no means limited to this. The input apparatus 10 may generate a virtual keyboard, in which a left hand virtual keyboard and a right hand virtual keyboard are integrated as one. Furthermore, when the distance between the right hand and the left hand becomes equal to or less than a predetermined value, the input apparatus 10 may switch the right hand virtual keyboard and the left hand virtual keyboard to a virtual keyboard in which the two keyboards are integrated as one.

(4) In the embodiment described above, the hand shape data DR and DL are generated based on the first image data DG1 and the second image data DG2, but the present invention is by no means limited to this. As long as the hand shape data DR and DL can be generated in three dimensions, the input apparatus 10 may generate the hand shape data DR and DL based on output data from any sensor. For example, instead of the second image capture device 16, a depth camera that outputs data indicative of the depth to the subject may be employed as a sensor. When a depth camera is employed, the hand shape recognizer 20 may generate the hand shape data DR and DL, representing the shape of hands in three dimensions, based on the first image data DG1 and the depth data. Furthermore, sensors may be attached to the hands of the user U. In this case, the processor 11 may acquire position information from the sensors attached to the hands of the user, and input the position information to the hand shape recognizer 20. The hand shape recognizer 20 may generate the hand shape data DR and DL by combining the position information with output data from other sensors.

(5) In the embodiment described above, the palm shape data Dh is input to the estimation model 350, but the present invention is by no means limited to this. The pressed key specifier 35 may input the fingertip position data Dtp and the detection range data Dd other than the palm shape data Dh, to the estimation model 350. In this case, the palm shape specifier 32 shown in FIG. 3 may be omitted, so that the configuration of the right hand processor 30R and that of the left hand processor 30L can be simplified. Furthermore, the pressed key specifier 35 may estimate a virtual key that is pressed, by inputting the hand shape data DR, instead of the palm shape data Dh and the fingertip position data Dtp, to the estimation model 350.

(6) In the embodiment described above, the virtual keyboard data KB1 and KB2 are generated, and an image of a virtual keyboard is arranged in virtual space displayed on the display device 14, but the present invention is by no means limited to this. A virtual keyboard does not have to be displayed. For example, when the user U activates email software while a music video is displayed on the display device 14, it is not always necessary to display a virtual keyboard. Even if a virtual keyboard is not displayed, the user U is still able to input text or the like by touch typing.

(7) In the embodiment described above, the estimation model 350 may estimate a virtual key that is pressed, by taking into account candidates of input such as words or context. In addition, data related to the initial state of the estimation model 350 may be downloaded from a server depending on the gender, age, racial characteristics, etc., of the user U.

(8) In the embodiment described above, the input apparatus 10 is integrated with the first image capture device 15 and the second image capture device 16 as a single unit, but the present invention is by no means limited to this. For example, the first image capture device 15 and the second image capture device 16 may be wirelessly connected with the input apparatus 10. In this case, the input apparatus 10 may be a smartphone. Furthermore, the first image capture device 15 and the second image capture device 16 may be arranged on a desk, with the two being fixed a predetermined distance apart.

(9) The block diagrams that have been used to describe each embodiment described above show blocks in functional units. These functional blocks (components) may be implemented in freely chosen combinations of hardware and/or software. Also, the means for implementing each functional block is not particularly limited. That is, each functional block may be implemented by a single apparatus that is physically and/or logically aggregated, or may be implemented by directly and/or indirectly connecting two or more physically and/or logically separate apparatuses (by using cables and/or radio, for example) and using these apparatuses. Furthermore, the term "apparatus" used in the description of each embodiment described above may be replaced by other terms such as "circuit", "device", "unit", etc.

(10) The order of processes, sequences, flowcharts, etc., in each embodiment described above may be re-ordered as long as conflicts do not arise. For example, although various methods have been described in this specification with various components of steps in exemplary orders, the specific orders illustrated herein are by no means limiting.

(11) In each embodiment described above, the information and/or the like that are input and/or output may be stored in a specific place (for example, in a memory). The information and/or the like that are input and/or output can be overwritten, updated, or edited. The information and/or the like that are input and/or output may be deleted. The information and/or the like that are input and/or output may be transmitted to other pieces of apparatus.

(12) In each embodiment described above, determinations may be made based on values represented by one bit (0 or 1), may be made based on Boolean values ("true" or "false"), or may be made by comparing numerical values (for example, based on comparison with a predetermined value).

(13) In each embodiment described above, the storage device 12 is a recording medium that the processor 11 can read, and, although ROM and RAM have been shown as examples, may be constituted by, for example, a flexible disk, a magnetic optical disk (for example, a compact disc, a digital versatile disc, a Blu-ray (registered trademark) disk, etc.) a smart card, a flash memory device (for example, a card, a stick, a key drive, etc.), a CD-ROM (Compact Disc-ROM), a register, a removable disk, a hard disk, a floppy (registered trademark) disk, a magnetic stripe, a database, a server, and/or other appropriate storage media. Furthermore, programs may also be transmitted from the network. Furthermore, programs may be transmitted from the communication network via telecommunication lines.

(14) In each embodiment described above, the information, signals and/or other matters that have been described may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combinations of these.

(15) Each of the functions exemplified in FIG. 3 and FIG. 10 are implemented by any combinations of hardware and software. In addition, each function may be implemented by a single apparatus, or may be implemented by two or more apparatuses configured as separate entities from each other.

(16) The programs shown as examples in each embodiment described above, whether referred to as "software", "firmware", "middleware", "microcode", or "hardware description language", or called by other names, should be interpreted, broadly, as meaning instructions, instruction sets, codes, code segments, program codes, subprograms, software modules, applications, software applications, software packages, routines, subroutines, objects, executable files, execution threads, procedures, functions, etc. Also, software, instructions, etc., may be transmitted and received via communication media. For example, when software is transmitted from a website, a server or other remote sources by using wired technologies such as coaxial cables, optical fiber cables, twisted pair cables, digital subscriber lines (DSL) and so on, and/or by using wireless technologies such as infrared radiation, radio, microwaves and so on, these wired technologies and/or wireless technologies are also included in the definition of communication media.

(17) The information and parameters in each embodiment described above may be represented in absolute values, may be represented in relative values with respect to predetermined values, or may be represented using other applicable pieces of information. For example, radio resources may be specified using indices.

(18) In each embodiment described above, the case in which the input apparatus 10 is a mobile station is included. A mobile station may be referred to, by one skilled in the art, as a "subscriber station", a "mobile unit", a "subscriber unit", a "wireless unit", a "remote unit", a "mobile device", a "wireless device", a "wireless communication apparatus", a "remote device", a "mobile subscriber station", an "access terminal", a "mobile terminal", a "wireless terminal", a "remote terminal", a "handset", a "user agent", a "mobile client", a "client" or some other suitable terms.

(19) In each embodiment described above, the term "connected" and all the other variations of this term mean all direct or indirect connections or coupling between two or more elements, and may indicate the presence of one or more intermediate elements between two elements that are "connected" with each other. The connection between these elements may be physical or logical, or may be a combination of these. As used herein, two elements may be considered "connected" to each other by using one or more electrical wires, cables and/or printed electrical connections, and, as non-limiting and non-inclusive examples, by using electromagnetic energy, such as electromagnetic energy having wavelengths in radio frequency regions, microwave regions and optical (both visible and invisible) regions.

(20) In each embodiment described above, the phrase "based on" does not mean "based only on" unless otherwise specified. In other words, the phrase "based on" means both "based only on" and "based at least on".

(21) As used herein, reference to elements with designations such as "first", "second" and so on does not generally limit the number/quantity or order of these elements. These designations may be used herein as a convenient method of distinguishing between two or more elements. It then follows that making reference to the first and second elements does not mean that only two elements may be employed there, or that the first element must precede the second element in some way.

(22) In each embodiment described above, terms such as "including", "comprising" and variations of these are used in this specification or claims, these teens are intended to be inclusive, in a manner similar to the way the term "having" is used. Furthermore, the term "or" as used in this specification or claims is not intended to be an exclusive disjunction.

(23) Throughout this application, if articles including, for example "a", "an" and "the" in English, are added by translation, these articles mean "more than one", unless the context clearly indicates otherwise.

(24) It should be obvious to one skilled in the art that the present invention is by no means limited to the embodiment described herein. The present invention can be implemented with a variety of corrections and in a variety of variations, without departing from the spirit and scope of the present invention defined by the recitation of claims. Consequently, the description herein is provided only for the purpose of explaining examples, and should by no means be construed to limit the present invention in any way. In addition, a plurality of modes selected from the modes illustrated herein may be combined.

DESCRIPTION OF REFERENCE SIGNS

10 . . . input apparatus, 20 . . . hand shape recognizer, 33 . . . determiner, 34 . . . virtual key setter, 35 . . . pressed key specifier, 350 . . . estimation model, 351 . . . learner, DL, DR . . . hand shape data, Dh . . . palm shape data, Dtp . . . fingertip position data.

The invention claimed is:

1. An input apparatus comprising:
a determiner configured to determine a reference plane, on which a plurality of virtual keys are arranged, based on fingertip positions of at least three fingers from among fingertip positions of a plurality of fingers in an initial state;
a virtual key setter configured to set on the reference plane, based on a fingertip position of a specific finger from among the fingertip positions of the at least three fingers in the initial state, a plurality of detection ranges that correspond to respective ones of the plurality of virtual keys and that each detect a pressing of a corresponding virtual key; and
a pressed key specifier configured to specify a virtual key that is pressed, from among the plurality of virtual keys, according to a positional relationship between the fingertip positions of the plurality of fingers in an input operation, and the plurality of detection ranges set on the reference plane for each of the plurality of virtual keys, wherein:
the pressed key specifier comprises:
an estimation model configured to estimate a virtual key that is pressed, from among the plurality of virtual keys, based on:
fingertip position data indicative of the fingertip positions of the plurality of fingers;
palm shape data indicative of a shape of a palm; and
the plurality of detection ranges; and
a learner configured to reflect, to the estimation model, whether the virtual key estimated based on the estimation model is correct or incorrect.

2. The input apparatus according to claim 1, wherein:
the fingertip positions of the at least three fingers include a fingertip position of a little finger, a fingertip position of a ring finger, and a fingertip position of a thumb; and
the determiner is configured to determine the reference plane based on the fingertip position of the little finger, the fingertip position of the ring finger, and the fingertip position of the thumb.

3. The input apparatus according to claim 1, wherein the virtual key setter is configured to set the plurality of detection ranges on a per finger basis.

4. The input apparatus according to claim 1, wherein the virtual key setter is configured to set a detection range for use for specifying that a next virtual key is pressed, based on the fingertip position of the specific finger and a virtual key immediately previous pressing of which is specified by the pressed key specifier, from among the plurality of virtual keys.

5. The input apparatus according to claim 4, further comprising a hand shape recognizer configured to, based on output data that is output from a sensor, generate hand shape data representative of the shape of a hand in three dimensions,
wherein the fingertip position data and the palm shape data that are input to the estimation model are specified based on the hand shape data.

6. The input apparatus according to claim 1, further comprising a display configured to display, on a virtual keyboard on which the plurality of virtual keys are arranged, an image of a virtual key that is not pressed and an image of the virtual key that is pressed and is specified by the pressed key specifier, such that the image of the virtual key that is not pressed and the image of the virtual key that is pressed are distinguishable from each other.

7. The input apparatus according to claim 1, wherein:
the determiner is configured to determine, based on fingertip positions of at least three fingers of a right hand in the initial state, a first reference plane corresponding to the right hand as the reference plane, and determines, based on fingertip positions of at least three fingers of a left hand in the initial state, a second reference plane corresponding to the left hand as the reference plane;
the virtual key setter is configured to:
  set, on the first reference plane corresponding to the right hand, the plurality of detection ranges as a plurality of detection ranges for the right hand, based on a fingertip position of a specific finger of the right hand in the initial state from among the fingertip positions of the at least three fingers of the right hand, and
  set, on the second reference plane corresponding to the left hand, the plurality of detection ranges as a plurality of detection ranges for the left hand, based on a fingertip position of a specific finger of the left hand in the initial state from among the fingertip positions of the at least three fingers of the left hand; and
the pressed key specifier is configured to:
  specify, according to a positional relationship between fingertip positions of a plurality of fingers of the right hand in the input operation and the plurality of detection ranges for the right hand, a virtual key that is pressed by the right hand from among the plurality of virtual keys, and
  specify, according to a positional relationship between fingertip positions of a plurality of fingers of the left hand in the input operation and the plurality of detection ranges for the left hand, a virtual key that is pressed by the left hand from among the plurality of virtual keys.

* * * * *

UNITED STATES PATENT AND TRADEMARK OFFICE
CERTIFICATE OF CORRECTION

PATENT NO. : 11,507,181 B2
APPLICATION NO. : 17/269079
DATED : November 22, 2022
INVENTOR(S) : Shigeru Akamatsu et al.

It is certified that error appears in the above-identified patent and that said Letters Patent is hereby corrected as shown below:

In the Claims

In Claim 5, Column 16, Line 54, please change from "The input apparatus according to claim 4" to -- The input apparatus according to claim 1 --.

Signed and Sealed this
Twenty-eighth Day of March, 2023

Katherine Kelly Vidal
Director of the United States Patent and Trademark Office